United States Patent
Heinle

(10) Patent No.: US 9,474,085 B2
(45) Date of Patent: Oct. 18, 2016

(54) TECHNIQUE FOR COORDINATING TRANSMISSION AND RECEPTION ACTIVITIES IN A COMMUNICATION DEVICE WITH MULTIPLE RADIO INTERFACES

(75) Inventor: Frank Heinle, Nuremberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1 day.

(21) Appl. No.: 14/407,321

(22) PCT Filed: Jun. 13, 2012

(86) PCT No.: PCT/EP2012/002490
§ 371 (c)(1),
(2), (4) Date: Dec. 11, 2014

(87) PCT Pub. No.: WO2013/185786
PCT Pub. Date: Dec. 19, 2013

(65) Prior Publication Data
US 2015/0124669 A1 May 7, 2015

(51) Int. Cl.
*H04W 72/12* (2009.01)
*H04L 5/14* (2006.01)
*H04W 88/06* (2009.01)

(52) U.S. Cl.
CPC ............ *H04W 72/1242* (2013.01); *H04L 5/14* (2013.01); *H04W 88/06* (2013.01)

(58) Field of Classification Search
CPC .... H04W 72/1242; H04W 88/06; H04L 5/14
See application file for complete search history.

(56) References Cited

U.S. PATENT DOCUMENTS

| | | | | |
|---|---|---|---|---|
| 2009/0175169 A1* | 7/2009 | Kanodia | ............... | H04L 45/245 370/235 |
| 2009/0176454 A1 | 7/2009 | Chen et al. | | |
| 2009/0201862 A1* | 8/2009 | Okker | ............... | H04W 72/1242 370/329 |
| 2009/0219846 A1* | 9/2009 | Chan | ................. | H04W 52/0216 370/311 |
| 2010/0110921 A1* | 5/2010 | Famolari | ............... | H04W 48/17 370/252 |
| 2010/0135256 A1* | 6/2010 | Lee | ........................ | H04W 16/14 370/336 |
| 2012/0046000 A1* | 2/2012 | Gao | ....................... | H04W 72/02 455/73 |
| 2012/0188949 A1* | 7/2012 | Salkintzis | ............. | H04L 45/308 370/329 |
| 2013/0095806 A1* | 4/2013 | Salkintzis | ............. | H04L 65/601 455/414.3 |

\* cited by examiner

*Primary Examiner* — Brian D Nguyen
(74) *Attorney, Agent, or Firm* — Rothwell, Figg, Ernst & Manbeck, P.C.

(57) ABSTRACT

A technique for coordinating transmission and reception activities of two or more radio interfaces (12, 14) integrated in a communication device (10) is described. A priority setting is associated with information intended for transmission via the first radio interface (12). In a method implementation of the technique, the following steps are performed for the first radio interface (12). First, a signal indicative of an upcoming reception via the second radio interface (14) is received. Then, for an ongoing or scheduled transmission of information via the first radio interface (12), the priority setting associated with the information is determined. In a next step a decision regarding an interruption or a delay of the transmission is performed depending on the priority setting associated with the information.

20 Claims, 5 Drawing Sheets

TECHNIQUE FOR COORDINATING TRANSMISSION AND RECEPTION ACTIVITIES IN A COMMUNICATION DEVICE WITH MULTIPLE RADIO INTERFACES

CROSS-REFERENCE TO RELATED APPLICATION

This application is a 35 U.S.C. §371 National Phase Entry Application from PCT/EP2012/002490, filed Jun. 13, 2012, and designating the United States.

TECHNICAL FIELD

The present disclosure generally relates to a communication device with two or more radio interfaces. Specifically, a technique for coordinating transmission and reception activities of the radio interfaces is described.

BACKGROUND

In modern communication devices such as smartphones and tablet computers an increasing number of radio interfaces operate in parallel. Some radio interfaces like those defined by the family of 3rd Generation Partnership Project (3GPP) specifications are enabled to co-operate in such a way that there is no need for a transmission on one radio interface while another radio interface is receiving. In this way, in-device co-existence issues of the radio interfaces (e.g., in terms of mutual interference) can be avoided.

On the other hand there also exist radio interfaces which per se are not co-operative. For example, Bluetooth, Wideband Local Area Network (WLAN) and Global Navigation Satellite System (GNSS) radio interfaces will on a physical layer level typically not co-operate in any way with the radio interfaces defined in the 3GPP specifications.

Many use cases such as WLAN tethering or a Voice over Internet Protocol (VoIP) call with a Bluetooth headset may require a simultaneous operation of the WLAN or Bluetooth radio interface and of a cellular radio interface. Both WLAN and Bluetooth presently operate in the so-called ISM band (2400 MHz-2483 MHz), and beyond. The Frequency Division Duplex (FDD) mode of the 3GPP Long Term Evolution (LTE) radio interface may be operated in band 7 (2500 MHz-2570 MHz). The Time Division Duplex (TDD) mode of the LTE radio interface may be operated in band 40 (2300 MHz-2400 MHz) or band 41 (2496 MHz-2690 MHz). Due to the close proximity of LTE bands 7, 40 and 41 on the one hand and the ISM band on the other hand, measures have to be taken to limit the interference between the radio interfaces.

Similar interference problems occur between GNSS bands L1 and E1 (1575.42 MHz) and second order harmonics of an LTE FDD uplink signal in band 13 (777 MHz-787 MHz) or band 14 (788 MHz-798 MHz). GNSS applications typically operate at an extremely low signalling level that requires long correlation and averaging times to capture the satellite signals. As will be appreciated, an intermittent LTE transmission may even further extend the GNSS correlation and averaging times.

To combat such interference problems, filtering has been suggested for radio link protection in communication devices that integrate multiple radio interfaces. It has, however, been found that pure filtering is inadequate in case of only narrow gaps between the involved bands and because of the entailed extreme filter requirements. Another solution would be frequency evasion for certain use cases such as an LTE voice call with a Bluetooth headset. In such a situation, however, a significant portion of a network operator's frequency band would not be available for many use cases. Furthermore, additional signalling with the network side would be required. A still further approach for radio link protection could be a non-overlapping scheduling of the transmission and reception activities of different radio interfaces. Such a solution would on the other hand significantly restrict the scheduling possibilities and would hardly be appropriate for FDD solutions that do not have a natural uplink/downlink separation in the time domain.

SUMMARY

To enable a satisfactory co-existence of multiple radio interfaces in a single communication device, co-existence signalling between the radio interfaces and a suppression of transmission activities on one radio interface in case of signalled reception activities on the other radio interface may be considered. A suppression of transmission activities may, however, severely affect the link quality in case critical uplink information is dropped in an uncontrolled way.

Accordingly, there is a need for a technique of coordinating transmission and reception activities of two or more radio interfaces integrated in a communication device, wherein the coordination is performed in such a manner that a satisfactory behaviour of the communication device from the perspective of at least one of a network operator and a user of the device is obtained.

According to a first aspect, a method of coordinating transmission and reception activities of two or more radio interfaces integrated in a communication device is provided, wherein a priority setting is associated with information intended for transmission via a first radio interface. The method comprises the following steps performed for the first radio interface: receiving a signal indicative of an upcoming reception via a second radio interface, determining for on-going or scheduled transmission of information via the first radio interface the priority setting associated with the information, and performing a decision regarding an interruption or a delay of the transmission depending on the priority setting associated with the information.

The method may further comprise interrupting or delaying the transmission as a result of the decision. In this regard, the result of the decision may be communicated to a transmission controller in communication with, or integrated in, the actual transmitter.

In one implementation, the step of determining the priority setting may be performed responsive to receipt of the signal indicative of the upcoming reception via the second radio interface. The signal indicative of the upcoming reception may take various forms, including one or both of a simple reception flag and an explicit transmission suppression request signal. In one variant, a real-time signalling connection may established between the two or more radio interfaces for real-time signalling of the upcoming reception.

The method may further comprise associating the priority setting with the information intended for the transmission. There exist various possibilities for such an association, including transporting the priority setting together with or independent from the information intended for transmission. The priority setting as such may also take various forms. As an example, the priority setting may be a binary parameter (e.g., a priority flag) or a multi-level parameter (with discrete or continuous values).

A priority setting association procedure may comprise two or more steps. As an example, such a procedure may comprise a first step of analysing the content of the information intended for transmission and a second step of associating the priority setting dependent on a result of the analysis.

The information intended for transmission via the first radio interface may be physical layer information. Additionally, or in the alternative, the information intended for transmission via the first radio interface may be higher layer information. The physical layer information may be generated on a physical layer of a layered protocol stack, and the higher layer information may be generated on a protocol layer above the physical layer. As an example, the higher layer information may be Medium Access Control layer (MAC) information and/or application layer information.

A priority setting preventing or impeding an interruption or a delay of the transmission may be associated with the physical layer information if the analysis yields that the content of the physical layer information is at least one of a reference signal, an ACK, a NACK, a channel quality feedback, a link adaption feedback, a scheduling request, and a random access request. The ACK and/or the NACK may be generated by an Automatic Repeat Request (ARQ) mechanism on the physical layer. In a similar manner, a priority setting preventing or impeding an interruption or delay of the transmission may be associated with the higher layer information if the analysis yields that the content of the higher layer information is at least one of a re-transmission (e.g., a MAC re-transmission) and control channel information. The control channel information may be generated by a protocol layer above the MAC layer, such as a Radio Resource Control (RRC) layer.

As understood herein, an interruption or a delay of the transmission is prevented if the transmission is unconditionally performed. On the other hand, impeding an interruption or a delay of the transmission may in exceptional cases (e.g., subject to a further decision step) still result in the transmission being interrupted or delayed.

The method may comprise multiplexing the physical layer information with the higher layer information to generate multiplexed information intended for transmission via the first radio interface. In such a multiplexing scenario a first priority setting may be associated with the multiplexed information on the basis of at least one of a second priority setting associated with the physical layer information and a third priority setting associated with the higher layer information. An interruption or a delay of the transmission may be performed on the basis of the first priority setting. In one scenario, the first priority setting prevents or impedes an interruption or a delay of the transmission if at least one of the second priority setting and the third priority setting prevents or impedes an interruption or a delay of the transmission. If, for example, the second priority setting and the third priority setting are binary values with a binary "1" preventing or impeding an interruption or a delay, a logical OR operation may be performed to determine the first priority setting.

In certain implementations a notification signal may be generated in case it is decided to interrupt or delay the transmission of information. Occurrence of notification signals may be monitored (e.g., using a counter or any other aggregation tool) and the priority setting may be associated dependent on the monitoring.

Additionally, or as an alternative, a priority setting preventing or impeding an interruption or a delay of transmission of information may be associated if a notification signal has already been generated for that information. To identify whether or not a notification signal has already been generated for a particular item of information, an identifier concept may be implemented. In this context, one or both of the information intended for transmission and a corresponding transmission resource intended for transmission of the information may be associated with an identifier. The identifier for which the transmission has been or will be interrupted or delayed may be returned in connection with the notification signal. As an example, the notification signal may include the identifier or may otherwise be associated with the identifier. The transmission resource may be a transmission slot such as a frame or sub-frame. The frame or sub-frame may have a frame or sub-frame number that forms the basis for deriving the identifier.

As a further alternative or in addition, the priority setting may be associated with the information intended for transmission dependent on an error rate, wherein the error rate takes into account previously interrupted or delayed transmissions. As an example, the error rate may be a transmission block error rate affected by interrupting or delaying individual transmissions.

The first radio interface and the second radio interface may be configured to utilize closely spaced carrier frequencies (including the consideration of second or higher order harmonics). The first radio interface may be a cellular radio interface. As an example, the first radio interface may conform to one of the Long Term Evolution (LTE), Wideband Code Division Multiple Access (W-CDMA), Global System for Mobile Communication (GSM), Time Division Synchronous CDMA (TD-SCDMA) and CDMA 2000 specifications. The second radio interface may conform to one of the WLAN, Bluetooth and GNSS specifications. Of course, the communication device may also comprise three or more radio interfaces that may be coupled with each other for the purpose of signalling (e.g., in real-time) upcoming reception activities.

Also provided is a computer program product comprising program code portions for performing the steps of any of the methods and method aspects presented herein when the computer program product is executed on one or more computing devices. The computer program product may be stored on a computer readable recording medium such as a semiconductor memory, CD-ROM, DVD, hard disk or any other storage medium. The computer program product may also be provided for download via a network connection.

Further provided is an apparatus for coordinating transmission and reception activities of two or more radio interfaces integrated in a communication device, wherein a priority setting is associated with information intended for transmission via a first radio interface. The apparatus comprises an input interface configured to receive a signal indicative of an upcoming reception via a second radio interface and a processor configured to determine for an on-going or scheduled transmission of information via the first interface the priority setting associated with the information. The processor is further configured to perform a decision regarding an interruption or a delay of the transmission depending on the priority setting associated with the information intended for transmission.

Also provided is a cellular modem comprising the apparatus and the first radio interface. Still further, a communication device comprising the cellular modem and the second radio interface is provided. The communication device may take the form of a mobile telephone, smartphone, tablet computer, base station (or any other stationary device), and so on.

BRIEF DESCRIPTION OF THE DRAWINGS

Further details, aspects and advantages of the present disclosure will become apparent from the following description of exemplary embodiments in conjunction with the drawings, wherein.

DETAILED DESCRIPTION

In the following description, for purposes of explanation and not limitation, specific details are set forth, such as specific device configurations and specific signalling scenarios, in order to provide a thorough understanding of the present disclosure. It will be apparent to one skilled in the art that the technique presented herein may be practised in other embodiment that depart from these specific details. The skilled artisan will appreciate, for example, that the technique discussed herein may be practised in combination with other device configurations and different signalling steps. While the following embodiments will partially be described in connection with a radio interface conforming to the 3GPP LTE specifications, it will be appreciated that the present disclosure can be implemented in connection with any 3GPP or non-3GPP communication standard.

Those skilled in the art will further appreciate that the methods, steps and functions explained herein may be implemented using individual hardware circuitry, using software functioning in conjunction with a programmed microprocessor or general purpose computer, using one or more Application Specific Integrated Circuits (ASICs), one or more Digital Signal Processors (DSPs) and/or one or more Field Programmable Gate Arrays (FPGAs). It will also be appreciated that the methods, steps and functions disclosed herein may be embodied in a processor and a memory coupled to the processor, wherein the memory stores program code that results in an execution of the steps discussed herein when executed by the processor.

Figure 1:
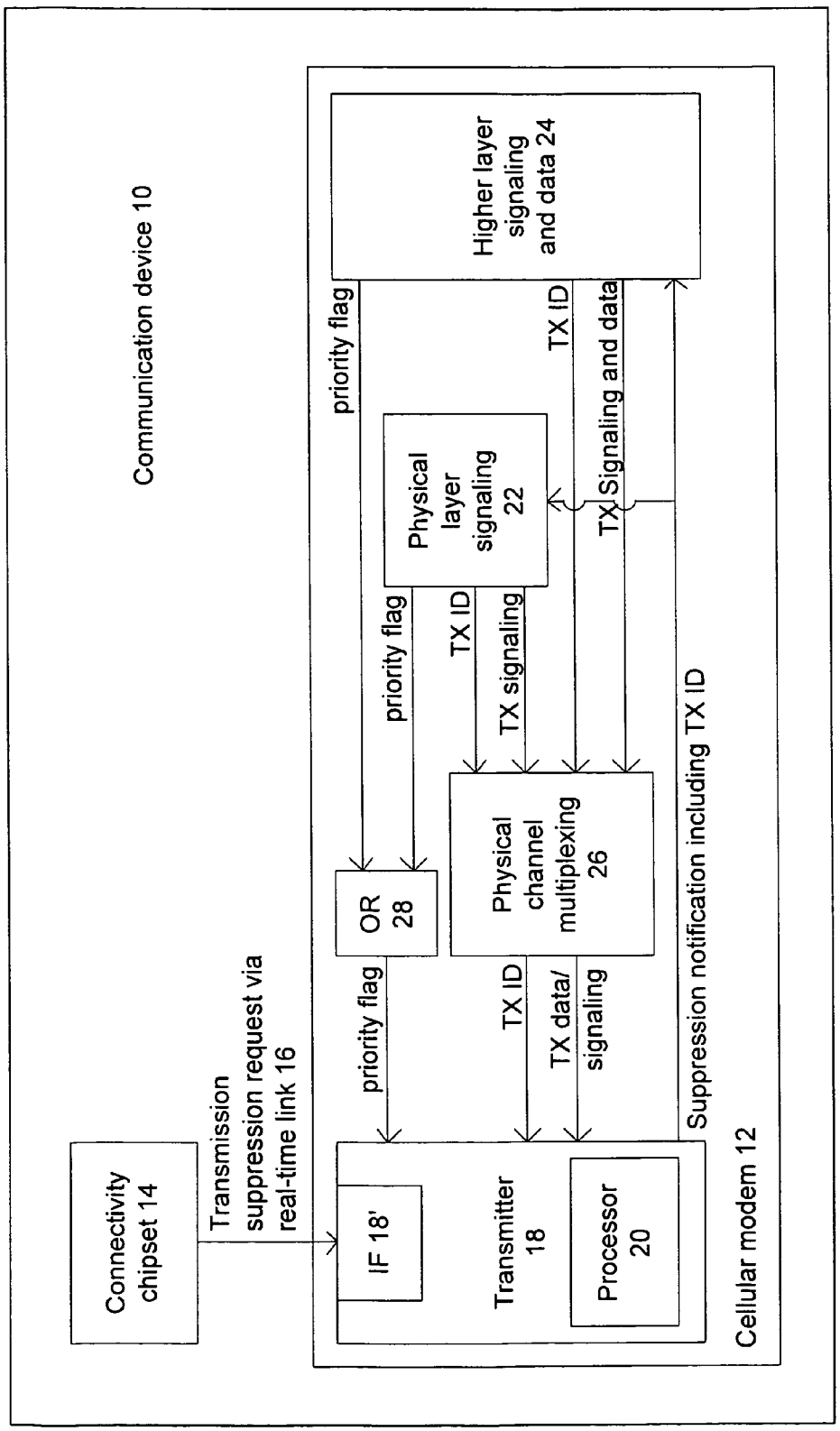
FIG. 1 schematically illustrates an embodiment of a communication device with two radio interfaces.

FIG. 1 illustrates an embodiment of a communication device 10 with multiple radio interfaces 12, 14. Specifically, as shown in FIG. 1, the communication device 10 comprises a first radio interface 12 and a second radio interface 14. The first radio interface 12 may conform to any cellular (e.g., 3GPP or non-3GPP) or non-cellular communication standard. In the following it will be assumed that the first radio interface 12 is a cellular modem that conforms at least to the LTE specifications. The second radio interface 14 may likewise conform to any cellular or non-cellular communication standard. In the present embodiment it will be assumed that the second radio interface 14 is a connectivity chip set such as a WLAN radio interface or a Bluetooth radio interface. In other embodiments, the second radio interface 14 may be a GNSS radio interface, for example according to the Global Positioning System (GPS) or Galileo specifications.

As will be appreciated, the first radio interface 12 (LTE) and the second radio interface 14 (WLAN/Bluetooth) are configured to utilize closely spaced carrier frequencies (including the consideration of second and higher order harmonics). For this reason real-time signalling between the radio interfaces 12, 14 via a signalling link 16 is enabled. The transmission of signals (in the form of transmission suppression requests) from the second radio interface 14 indicates to the first radio interface 12 an upcoming reception via the second radio interface 14 and requests a temporary shutdown of the first interface 12 in the transmitter/uplink path.

While the signalling across the signalling link 16 is illustrated in the exemplary embodiment of FIG. 1 to be a mono-directional signalling from the second radio interface 14 to the first radio interface 12, it will be appreciated that in other embodiments a bi-directional signalling may occur. Moreover, it will also be appreciated that in other embodiments additional radio interfaces with additional signalling links may be present.

It has been found that blindly controlling transmission activities of the first radio interface 12 based on transmission suppression requests from the second radio interface 14 may have detrimental effects on the link quality of the first radio interface 12 (or even cause a link failure and/or dropped calls for the first radio interface 12). Therefore, the first radio interface 12 illustrated in FIG. 1 is configured to prioritize one or more uplink traffic classes and to ignore, or discard, incoming transmission suppression requests from the second radio interface 14 if the suppression of transmission activities would be detrimental to the radio link quality from the perspective of the first radio interface 12.

As illustrated in FIG. 1, the first radio interface 12 comprises a transmitter 18 with an associated input interface 18' towards the second radio interface 14 for receiving transmission suppression request signalling. The transmitter 18 further comprises a processor 20 for performing one or more of the processing steps described hereinafter. It should be noted that in other embodiments the processor 20 may be external to the transmitter 18 or even external to the first radio interface 12.

The first radio interface 12 further comprises a component 22 for prioritizing and, optionally, forwarding or generating physical layer signalling as well as a component 24 for prioritizing and, optionally, forwarding or generating higher layer signalling and data. As understood herein, signalling may comprise control information and data may comprise user or application information. The higher layer signalling includes for example Radio Resource Control (RRC) and Medium Access Control (MAC) signalling.

With further reference to FIG. 1, the component 22 for generating physical layer signalling as well as the component 24 for higher layer signalling and data are coupled to a physical channel multiplexing unit 26. The multiplexing unit 26 is configured to multiplex the information received from the components 22, 24 to generate multiplexed information intended for transmission via the transmitter 18. To this end, the multiplexing unit 26 is coupled to the transmitter 18.

The first radio interface 12 also comprises a signal combiner 28 coupled on its input side to both the component 22 for physical layer signalling and the component 24 for higher layer signalling and data. On its output side, the signal combiner 28 is coupled to the transmitter 18.

In the following, the operation of the communication device 10 in connection with coordinating transmission and reception activities of the two radio interfaces 12, 14 will be described in more detail.

In brief, higher layers do an internal prioritization of upcoming transmissions based on the content of the information to be transmitted and on feedback from the transmitter 18 regarding any preceding suppressions (i.e., regarding interrupted or delayed transmissions). The information to be transmitted ("TX signalling and data" in FIG. 1) together with an associated unique identifier (TX ID) are forwarded by the component 24 to the multiplexing unit 26. Furthermore, a priority setting in the form of a binary priority flag indicating the priority of the information to be transmitted is forwarded to the signal combiner 28. In the present embodiment a logic "1" indicates a high priority of the information to be transmitted (i.e., that an interruption or delay of the transmission should be prevented or at least impeded).

In parallel, the physical layer performs an internal prioritization of upcoming transmissions based on the content of the information to be transmitted and on feedback from the transmitter 18 regarding any preceding suppressions (i.e., regarding an interruption or delay of previous transmissions). The information to be transmitted (TX signalling) together with an associated unique transmission identifier (TX ID) are forwarded to the multiplexing unit 26. Also, a priority setting in the form of a binary priority flag indicating the priority of the information to be transmitted is forwarded to the signal combiner 28.

The multiplexing unit 26 multiplexes the physical and higher layer information and forwards the multiplexed information (TX data/signalling) to the transmitter 18. The information to be transmitted is forwarded by the multiplexing unit 26 together with a unique transmission identifier (TX ID) calculated by the multiplexing unit 26 on the basis of the transmission identifiers received with the physical and higher layer information.

In one implementation, the sub-frame number of a frame to be transmitted could be used as the unique identifier for both the physical layer information and the higher layer information. In such an implementation, the content of the corresponding sub-frame may constitute the information to be transmitted.

The signal combiner 28 logically combines the physical and higher layer priority flags using a logical OR operation. Accordingly, if there is either physical layer information or higher layer information to be transmitted, or both simultaneously, and if at least one of them is prioritized (i.e., if the priority flag of at least one of them is set to "1"), a priority flag preventing or at least impeding an interruption or delay of the transmission of the corresponding information in the presence of a transmission suppression request from the second radio interface 14 is signalled to the transmitter 18. The transmitter 18 or a controller thereof that may be implemented by the processor 20 then decides in real-time based on the priority flag associated with the information intended for transmission as received from the multiplexing unit 26 (and, optionally, further information or settings) whether or not a currently on-going transmission is interrupted or whether a scheduled transmission will be delayed. In case a transmission is interrupted or delayed, the transmitter 18 returns a suppression notification signal back to the physical layer (component 22) and the higher layer (component 24). This suppression notification signal includes the transmission identifier (TX ID) of the sub-frame associated with the information transmission of which has been interrupted or delayed.

Having generally described the operation of the communication device 10 with reference to the signalling illustrated in FIG. 1, a more detailed description of its operation will now follow with respect to the flow diagrams of FIGS. 2A, 2B, 4 and 5.

Figures 2A, 2B:
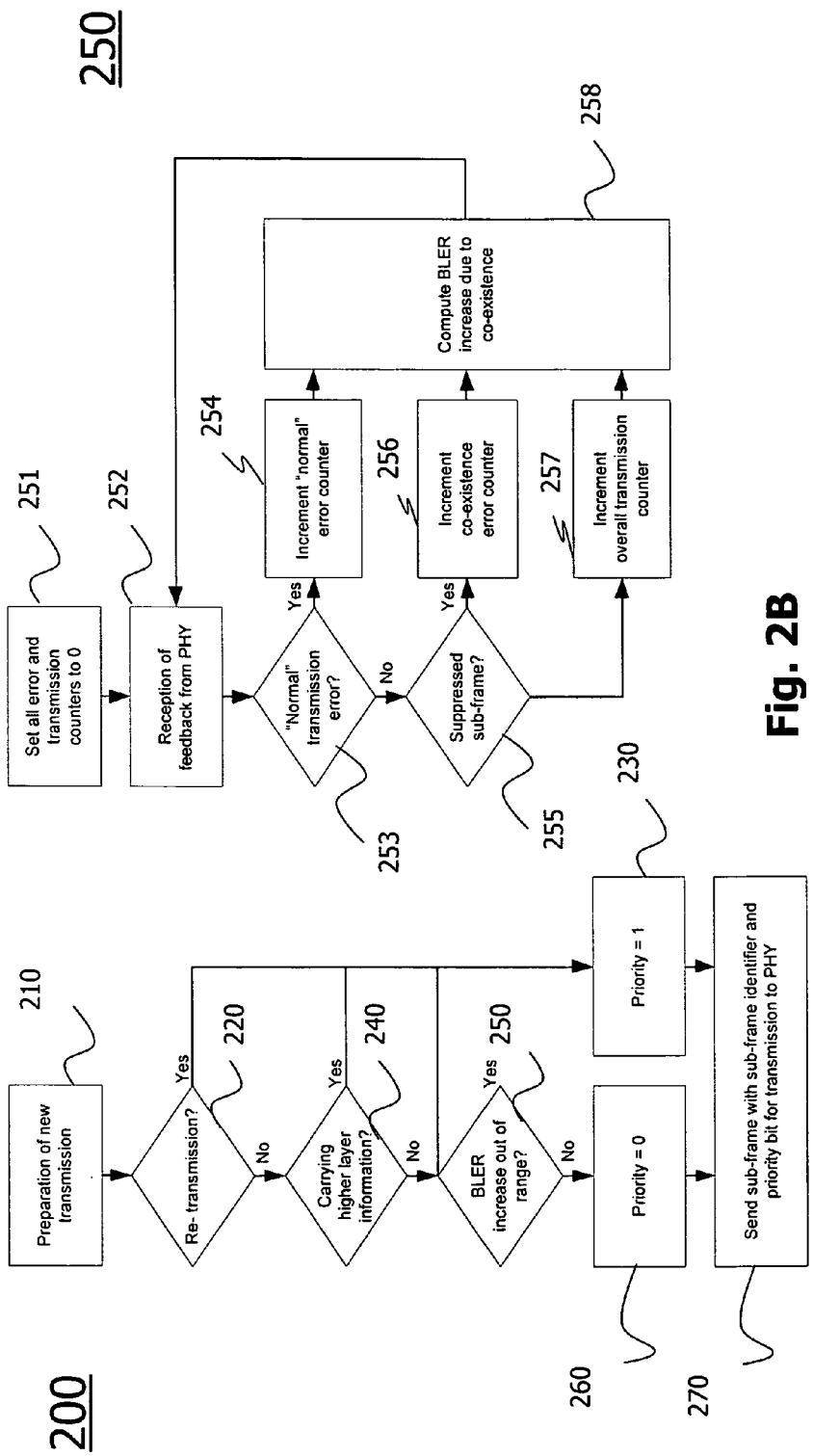
FIGS. 2A and 2B are flow diagrams illustrating method embodiments in connection with MAC layer processing.

MAC processing in the component 24 for prioritizing higher layer signalling and data will be described first with reference to FIGS. 2A and 2B. It should be noted that while the component 24 is illustrated in FIG. 1 to be fully integrated into the first radio interface 12, in other embodiments the component 24 may at least partially be located outside the first radio interface 12. For example, parts of the component 24 in charge of generating user or application data may be located outside the first radio interface 12. FIG. 2A illustrates in a flow diagram 200 the operation of the component 24 in connection with prioritization of higher layer information. The operation may be performed in a sub-frame basis.

The operation of the component 24 starts in step 210 with the preparation of information in the form of at least one of higher layer signalling and higher layer data for a new transmission. In principle, the prioritization may be performed differently for a control plane (higher layer signalling) and a user/data plane (higher layer data). In this context user/data plane information may generally include uplink user/application data. Typically, system performance is not seriously affected if a block of user/application data is occasionally dropped. Therefore, an initial transmission of user/application data need not be prioritized and may be suppressed in response to a transmission suppression request signal from the second radio interface 14. Re-transmissions, on the other hand shall, be prioritized to ensure a satisfying overall performance. Re-transmissions are typically requested from a network side if a block error occurred either due to co-existence of the two radio interfaces, 12, 14 or due to generally bad channel conditions.

Accordingly, in a first decision step 220 the content of the information intended for transmission is analysed, optionally together with information received from the network side, to determine if the information pertains to an initial transmission of user/application data or to a re-transmission of user/application data. In the case of a re-transmission the method proceeds to step 230. In step 230 a high priority setting ("1") is associated with the information (i.e., the associated sub-frame). Otherwise, the method proceeds to a second decision step 240.

In step 240 it is determined whether the information intended for transmission pertains to higher layer information and, specifically, to higher layer uplink signalling (e.g., RRC layer uplink signalling). The system performance may seriously be effected in case such higher layer uplink signalling is lost. In the present scenario, such signalling generally comprises dedicated or common control channel signalling. Such a signalling will unconditionally be prioritized in step 230 by setting the associated priority flag to "1". Otherwise the method proceeds to a third decision step 250.

As for step 250 it should be noted that next to the pure data throughput also the overall resulting Block Error Rate (BLER) is of importance with respect to the overall system performance as a significant increase of the BLER may pretend a radio link problem towards the network side. In the present exemplary embodiment it is proposed to accept a certain increase COEX_BLER_THR of the BLER caused by the radio link (radio channel) due to the co-existence of the two radio interfaces 12, 14. The number of all re-transmissions be $N_{Re-TX}$ and the number of suppressed transmissions derived by counting the returned suppression notification signals be $N_{sup}$. If the number of suppressions exceeds $$N_{sup} \geq N_{Re-TX} \cdot COEX\_BLER\_THR/(1+ COEX\_BLER\_THR),$$

the next transmission is prioritized in step 230. Otherwise, that is if all decision steps 220, 240, 250 were negative, a low priority is associated with the information to be transmitted in step 260. In step 260 the priority flag is set to "0" (or just remains unset) for the information to be transmitted.

In a final step 270 the information to be transmitted (i.e., the corresponding sub-frame) is forwarded by the component 24 together with the associated sub-frame identifier (TX ID) to the multiplexing unit 26. At the same time the priority flag, that has been set or not depending on the results of the decision steps 220, 240 and 250, is sent to the signal combiner 28.

FIG. 2B illustrates aspects of the BLER-based decision step 250 of FIG. 2A in more detail. Except for a preliminary step 251, the remaining steps illustrated in FIG. 2B may be performed in a continuous manner and independently from the operations illustrated in FIG. 2A.

In the preliminary step 251 all error and transmission counters are set to zero. In a next step 252 feedback is received from the transmitter 18 or the (physical layer) processor 20. It is determined in step 253 if the feedback pertains to a "normal" transmission error in terms of the BLER. In such a case the "normal" error counter for $N_{Re-TX}$ is incremented in step 254. Otherwise the method proceeds to decision step 255.

In step 255 it is determined if the feedback pertains to a suppression notification signal for a suppressed sub-frame. Should this be the case, a dedicated co-existence error counter for $N_{sup}$ is incremented in step 256. Based on $N_{Re-TX}$ and $N_{sup}$ the decision of step 250 in FIG. 2A can be carried out.

If both decision steps 253, 255 were negative, an overall transmission counter for $N_{overall}$ is incremented in step 257. Then, the BLER and the BLER increase due to the co-existence of two radio interfaces 12, 14 is computed in a further step 258. The BLER is calculated as $$BLER=(N_{Re-TX}+N_{sup})/N_{overall}.$$

From step 258 the method loops back to step 252 upon receipt of a further feedback from the transmitter 18 or the (physical layer) processor 20.

Figure 3:
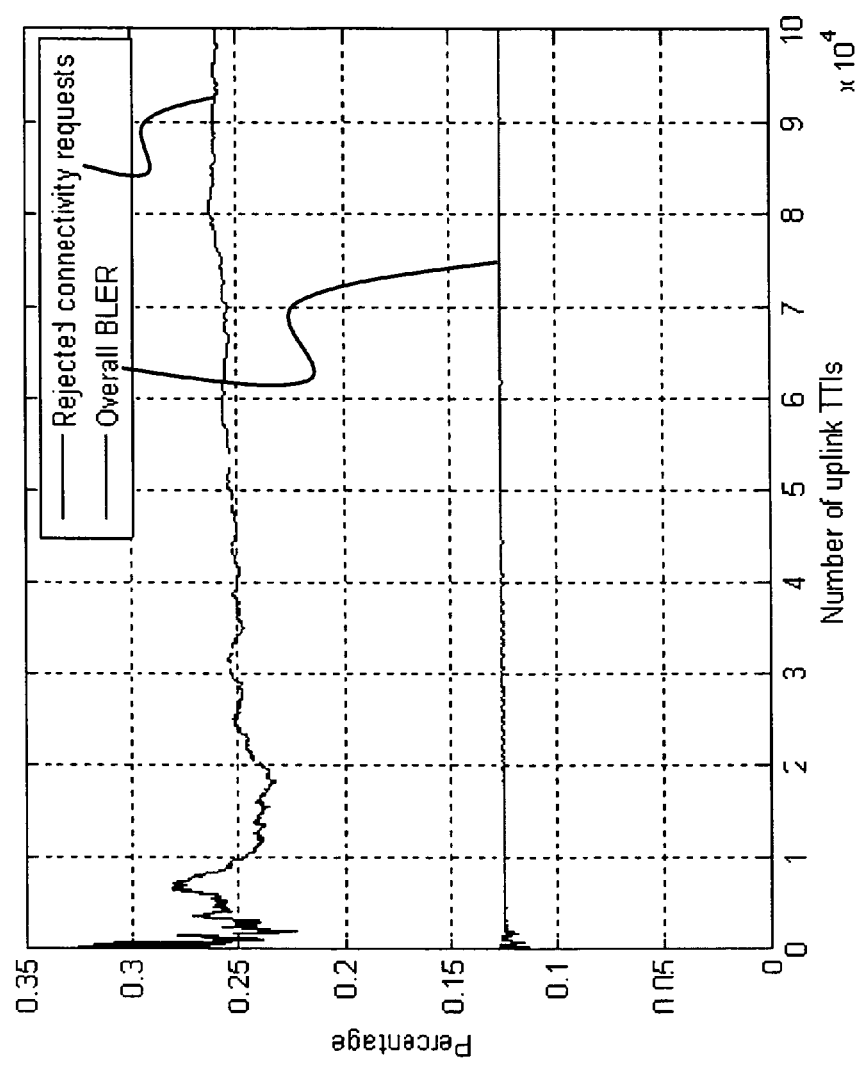
FIG. 3 is a schematic diagram illustrating a block error rate with respect to interrupted or delayed transmissions.

FIG. 3 illustrates an example with a simulated "normal" BLER of 10%, an accepted increase of 25% and a collision rate of 15% due to colliding transmission and reception activities of the two radio interfaces 12, 14. The collision rate is indicative of all LTE transmission steps collide with a suppression request signal from the second radio interface 14. As can be seen, the BLER quickly converges to a 12.5% target at the expense of "rejecting" approximately 25% of the suppression request signals from the second air interface 14. This shows that the prioritization concept presented herein is a simple mechanism to balance the co-existence impact between the two radio interfaces 12, 14.

Figure 4:
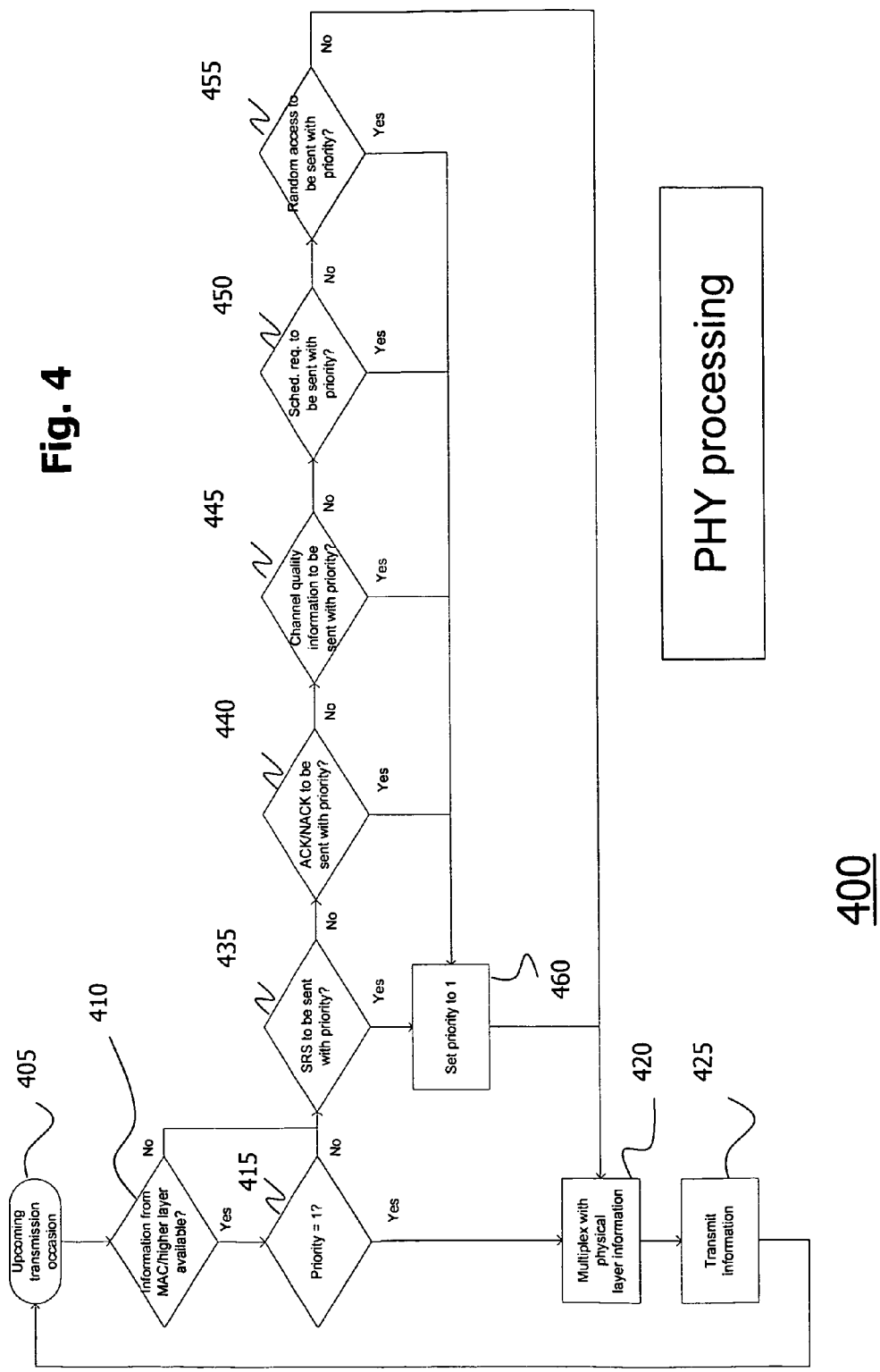
FIG. 4 is a flow diagram illustrating a method embodiment in connection with physical layer processing.

In the following, the operation of physical layer components, including the multiplexing unit 26, the signal combiner 28, the component 22 for prioritizing physical layer signalling and the transmitter 18 with the processor 20, will be jointly described with reference to the flow diagram 400 of FIG. 4.

The method starts in step 405 upon an upcoming transmission occasion. The upcoming transmission occasion may be signalled by the transmitter 18 or in any other way. It is then determined in step 410 if information from the MAC layer (and, optionally, any higher layer such as from the RRC layer) is available. This information may have been processed as illustrated in FIG. 2A. Should MAC/RRC/higher layer information be available it is determined in a subsequent decision step 415 if that information is associated with a high priority (i.e., if the priority flag has been set to "1"). If it is determined in step 415 that the MAC/RRC/higher layer information to be transmitted is associated with a high priority, the corresponding information is optionally multiplexed with any physical layer information in step 420 that may need to be transmitted also. In a next step 425 the multiplexed information is unconditionally transmitted since (at least) the priority flag associated with a MAC/RRC/higher layer information has been set to "1". This unconditional transmission in step 425 logically corresponds to the OR operation performed by the signal combiner 28.

If, on the other hand, it is determined in decision step 410 that for the upcoming transmission occasion there is no MAC/RRC/higher layer information available it is determined next in steps 435, 440, 445, 450 and 455 whether any physical layer signalling is available. Such signalling may have been received by the multiplexing unit 26 from the component 22 for prioritizing physical layer signalling.

In an initial decision step 435 it is decided whether Sounding Reference Signals (SRS) are to be sent with priority. In the present exemplary LTE implementation, SRSs are used to support uplink channel measurements on the network side. An SRS is transmitted periodically with a period between 2 ms and 320 ms. It is assumed that the network side for its downlink scheduling decisions will not only rely on the SRSs. Therefore, it is suggested never prioritizing frequent SRSs (e.g., that occur more often than every 10 ms or any other predefined period). All SRSs with a lower frequency will, on the other hand, be prioritized.

In the further decision step 440 it is determined whether Hybrid ARQ ACK/NACK signals are to be sent with priority. Suppressing an uplink NACK for a downlink packet is relatively uncritical since the network side will do a re-transmission when not receiving a response. This means that NACKs may never be prioritized. Suppressing an ACK on the other hand may cause detrimental effects on the network side. If there is no response the network side will assume a block error and re-transmit the corresponding packet in the downlink. In particular the unnecessary re-transmission of large packets will caused a waste of downlink resources and should thus be avoided. Therefore, it is proposed prioritizing ACK transmissions with a packet size above a certain threshold (e.g., above 10% of the maximum possible packet size).

In decision step 445 it is determined whether to link adaptation feedback, such as channel quality information, is to be sent with priority. In the present LTE implementation link adaptation feedback also includes pre-coding matrix indication or rank indication information. Such information can be reported according to two different variants, namely periodic reporting based on higher layer configurations and non-periodic reporting ordered by the network side. The periodic reporting may have periods between 2 ms and 128 ms. The network side most likely will do some averaging and statistics and not only rely on a single feedback. Therefore, it is suggested not prioritizing frequent feedback signalling (e.g., signalling occurring more often than every 10 ms or any other predefined period). All feedback signals with a lower frequency may, on the other hand, be prioritized. Since non-periodic reports are explicitly ordered by the network side and will not happen frequently, they may always be prioritized.

Since scheduling requests and random access transmissions are key procedures for setting up and maintaining a connection, a prioritizing decision will be taken in decision steps 450 and 455 for such information.

If any of the decision steps 435, 440, 445, 450 and 455 is answered in the affirmative, the priority flag will be set to "1" in step 460, which indicates a high priority of the information intended for transmission. Otherwise the priority flag will remain unset ("0").

Figure 5:
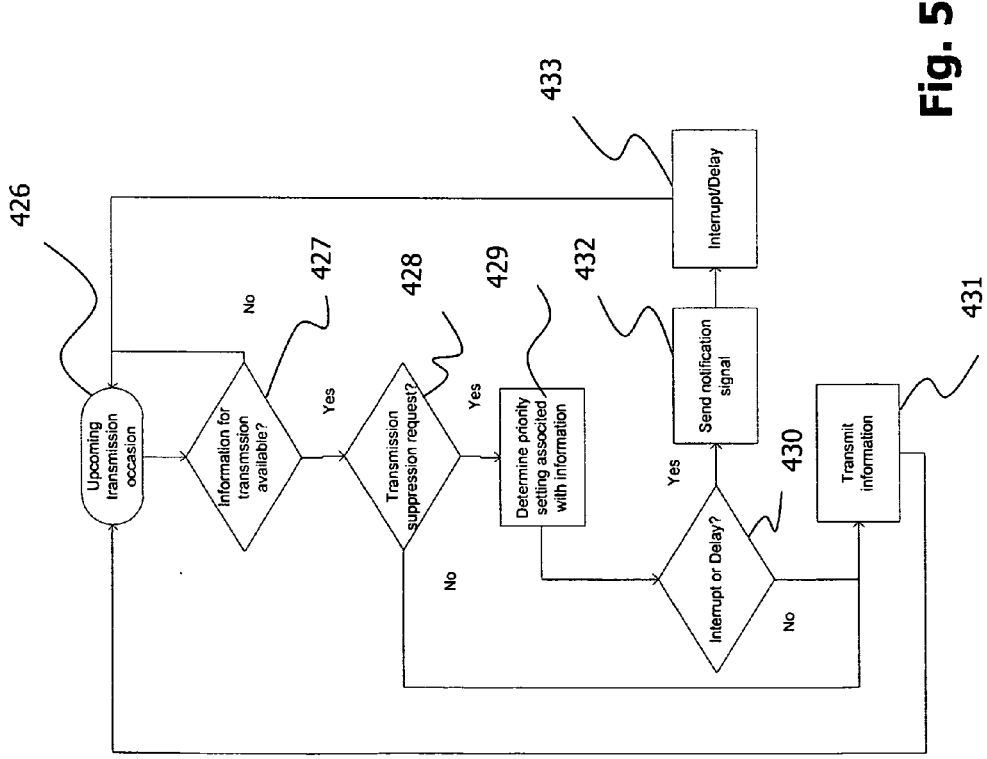
FIG. 5 is a flow diagram illustrating a method embodiment in connection with performing a decision regarding an interruption or a delay of a transmission.

As already explained above, in step 420 MAC/RRC/higher layer information will be multiplexed with physical layer information (depending on the availability of the corresponding information) and unconditionally be transmitted in step 425 if the priority flag has been set to "1" for any of the MAC/RRC/higher layer information and the physical layer information. Otherwise, if the corresponding information is associated with a low priority, an on-going transmission will be interrupted or a scheduled transmission will be delayed in the presence of a suppression request signal from the second radio interface 14. These processes will now be discussed in more detail with reference to FIG. 5. FIG. 5 illustrates the transmission step 425 of FIG. 4.

Once an upcoming transmission occasion is determined in an initial step 426, it is determined next in step 427 if any (physical/MAC/RRC/higher layer) information is available for transmission. Should this not be the case the method loops back to step 426. Otherwise it is determined in a first decision step 428 whether a transmission suppression request signal from the second radio interface 14 is present. As an example, the transmission suppression request signal may be realized by a suppression flag that is set and cleared by the second radio interface 14 depending on its reception activities. If no suppression has been requested by the second radio interface 15, the physical/MAC/RRC/higher layer information is unconditionally transmitted in step 431.

Otherwise (i.e., if suppression has been requested by the second radio interface 14), the method proceeds with step 429. In step 429 the priority stetting (i.e., the status of the priority flag) associated with the information intended for transmission is determined. In a next decision step 430 it then decided to interrupt or delay the transmission of the information intended for transmission depending on the associated priority setting. If the priority flag has been set to "1" for the information intended for transmission, the information is unconditionally transmitted in step 431. Otherwise, in step 432 a notification signal regarding suppression of the transmission is generated and sent to the component 22 for prioritizing physical layer signalling as well as to the component for prioritizing higher layer signalling and data (see FIG. 1). The notification signal includes the sub-frame number(s) of the sub-frame(s) transmission of which temporarily will be suppressed.

Then, the transmission is suppressed in step 433. As an example, an on-going transmission may be interrupted or a scheduled transmission may be delayed. Once the second radio interface no longer requests a suppression of transmissions by the first radio interface 12 (because reception activities of the second radio interface have ended), the interrupted transmission is continued or the delayed transmission is performed by proceeding from step 433 to either step 426 or, as an option, immediately to step 431.

As has become apparent from the above description of exemplary embodiments, the present disclosure permits an improved co-existence and interworking between various kinds of radio interfaces integrated into a single communication device. To this end a selective suppression of transmission activities of one radio interface is performed in case of upcoming reception activities of another radio interface. As an example, a cellular modem may protect its radio link by prioritizing a critical subset of its uplink transmissions.

In general, the overall system performance can be adjusted by a single or only a small number of parameters between two extremes (i.e., completely rejecting all transmission suppression requests on the one hand and accepting each single transmission suppression request on the other. The technique presented herein is easy to implement and may provide a hierarchical method to limit co-existence interference with more and more intrusive actions (i.e., depending on the interference level).

While the technique presented herein has been described with respect to particular embodiments, those skilled in the art will recognize that the present invention is not limited to the specific embodiments described herein. It is to be understood that this disclosure is only illustrative. Accordingly, it is intended that the invention be limited only by the scope of the claims appended hereto.

The invention claimed is:

1. A method of coordinating transmission and reception activities among at least two radio interfaces integrated in a communication device, said at least two radio interfaces comprising a first radio interface and a second radio interface, the method comprising:
    obtaining a suppression setting for information intended to be transmitted using the first radio interface, said suppression setting indicating whether or not a transmission of the information by the first radio interface should be suppressed as a result of receiving a transmission suppression request;
    receiving the transmission suppression request; and
    as a result of receiving the transmission suppression request, determining whether to suppress the transmission of the information, wherein the determination is based solely on the suppression setting for the information.

2. The method of claim 1, further comprising
    associating the suppression setting with the information intended for transmission.

3. The method of claim 2, further comprising
    analyzing the content of the information intended for transmission and associating the suppression setting dependent on a result of the analysis.

4. The method of claim 3, wherein
    a suppression setting preventing or impeding an interruption or delay of the transmission is associated with the physical layer information if the analysis yields that the content of the physical layer information is at least one of a reference signal, an ACK, a NACK, a channel quality feedback, a link adaption feedback, a scheduling request, and a random access request.

5. The method of claim 3, wherein
    a suppression setting preventing or impeding an interruption or delay of the transmission is associated with the higher layer information if the analysis yields that the content of the higher layer information is at least one of a re-transmission and control channel information.

6. The method of claim 2, wherein
    associating the suppression setting with the information intended for transmission is performed dependent on an error rate that takes into account previously suppressed transmissions.

7. The method of claim 1, wherein
    the information intended for transmission via the first radio interface is at least one of physical layer information and higher layer information, wherein the physical layer information is generated on a physical layer of a protocol stack and the higher layer information is generated on a protocol layer above the physical layer.

8. The method of claim 7, further comprising
multiplexing the physical layer information with the higher layer information to generate multiplexed information intended for transmission via the first interface; and determining a first suppression setting associated with the multiplexed information on the basis of at least one of a second suppression setting associated with the physical layer information and a third suppression setting associated with the higher layer information, wherein the determining of whether to suppress the transmission of the information is performed solely on the basis of the first suppression setting.

9. The method of claim 8, wherein the first suppression setting prevents or impedes an interruption or delay of the transmission if at least one of the second suppression setting and the third suppression setting prevents or impedes an interruption or delay of the transmission.

10. The method of claim 1, further comprising generating a notification signal in case it is decided to supress the transmission of the information.

11. The method of claim 10, further comprising:
associating the suppression setting with the information intended for transmission;
monitoring the occurrence of notification signals; and
associating the suppression setting dependent on the monitoring.

12. The method of claim 10, further comprising:
associating the suppression setting with the information intended for transmission; and
associating a suppression setting preventing or impeding an interruption or delay of the transmission of information if a notification signal has already been generated for that information.

13. The method of claim 10, wherein
at least one of the information intended for transmission and a transmission resource intended for transmission of the information is associated with an identifier, and further comprising returning, in connection with the notification signal, the identifier for which the transmission has been suppressed.

14. The method of claim 1, wherein
the first radio interface and the second radio interface are configured to utilize closely spaced carrier frequencies.

15. The method of claim 1, wherein
the first radio interface conforms to one of the LTE, W-CDMA, GSM, TD-SCDMA and CDMA 2000 specifications and the second radio interface conforms to one of the WLAN, Bluetooth and GNSS specifications.

16. A computer program product comprising a non-transitory computer readable medium storing program code for performing the method of claim 1 when the program code is executed on one or more computing devices.

17. A method of coordinating transmission and reception activities among at least two radio interfaces integrated in a communication device, said at least two radio interfaces comprising a first radio interface and a second radio interface, the method comprising:
the first radio interface obtaining information associated with a first suppression setting, said first suppression setting indicating that a transmission of the information should be suppressed in the event that a transmission suppression request is received from the second radio interface;
receiving the transmission suppression request from the second radio interface;
as a result of receiving the transmission suppression request from the second radio interface, suppressing the transmission of the information and associating the information with a second suppression setting, said second suppression setting indicating that a further transmission of the information should not be suppressed in the event that a further transmission suppression request is received from the second radio interface;
receiving the further transmission suppression request from the second radio interface;
as a result of receiving the further transmission suppression request from the second radio interface, determining, based on the second suppression setting, that the further transmission of the information should not be suppressed; and
after determining that the further transmission of the information should not be suppressed, transmitting the information at the next available transmission opportunity.

18. An apparatus, comprising:
a first radio interface; and
a second radio interface, wherein
the first radio interface is operable to:
obtain a suppression setting for information intended to be transmitted using the first radio interface, said suppression setting indicating whether or not a transmission of the information by the first radio interface should be suppressed as a result of a transmission suppression request sent by the second radio interface; and
as a result of receiving the transmission suppression request sent by the second radio interface, determine whether to suppress the transmission of the information, wherein the determination is based solely on the suppression setting for the information.

19. A cellular modem comprising:
the apparatus of claim 18.

20. A communication device comprising:
the cellular modem of claim 19.

* * * * *